(12) United States Patent
Azulay et al.

(10) Patent No.: US 8,332,848 B2
(45) Date of Patent: Dec. 11, 2012

(54) MECHANISM FOR STAGED UPGRADES OF A VIRTUAL MACHINE SYSTEM

(75) Inventors: Barak Azulay, Nes-Ziona (IL); Yuval Kashtan, Mishmeret (IL)

(73) Assignee: Red Hat Israel, Ltd., Raanana (IL)

( * ) Notice: Subject to any disclaimer, the term of this patent is extended or adjusted under 35 U.S.C. 154(b) by 870 days.

(21) Appl. No.: 12/402,929

(22) Filed: Mar. 12, 2009

(65) Prior Publication Data
US 2010/0235825 A1 Sep. 16, 2010

(51) Int. Cl.
G06F 9/44 (2006.01)
G06F 9/455 (2006.01)
(52) U.S. Cl. .............................. 718/1; 717/168; 717/172
(58) Field of Classification Search .......................... None
See application file for complete search history.

(56) References Cited

U.S. PATENT DOCUMENTS

| | | | |
|---|---|---|---|
| 6,389,592 B1 * | 5/2002 | Ayres et al. | 717/172 |
| 7,430,610 B2 * | 9/2008 | Pace et al. | 717/172 |
| 7,480,773 B1 * | 1/2009 | Reed | 711/153 |
| 7,761,573 B2 * | 7/2010 | Travostino et al. | 718/1 |
| 7,882,326 B2 * | 2/2011 | Armstrong et al. | 718/1 |
| 2005/0071385 A1 * | 3/2005 | Rao | 707/200 |
| 2006/0005189 A1 * | 1/2006 | Vega et al. | 718/1 |
| 2006/0184937 A1 * | 8/2006 | Abels et al. | 718/1 |
| 2007/0006205 A1 * | 1/2007 | Kennedy et al. | 717/168 |
| 2007/0180436 A1 * | 8/2007 | Travostino et al. | 717/168 |
| 2007/0192765 A1 * | 8/2007 | Shimogawa et al. | 718/1 |
| 2007/0245334 A1 * | 10/2007 | Nieh et al. | 717/168 |
| 2008/0047015 A1 * | 2/2008 | Cornwall et al. | 726/25 |
| 2008/0244577 A1 * | 10/2008 | Le et al. | 718/1 |
| 2008/0295095 A1 * | 11/2008 | Watanabe et al. | 718/1 |
| 2009/0007106 A1 * | 1/2009 | Araujo et al. | 718/1 |
| 2009/0070760 A1 * | 3/2009 | Khatri et al. | 718/1 |
| 2009/0089781 A1 * | 4/2009 | Shingai et al. | 718/1 |
| 2009/0106409 A1 * | 4/2009 | Murata | 709/223 |
| 2009/0106748 A1 * | 4/2009 | Chess et al. | 717/168 |
| 2009/0144721 A1 * | 6/2009 | Wagner et al. | 717/172 |
| 2010/0070978 A1 * | 3/2010 | Chawla et al. | 718/105 |

OTHER PUBLICATIONS

VMware et al, Introduction to Virtual Desktop Manager, revision 20080527, Item:VDM-ENG-Q108-451, [Retrieved on Dec. 20, 2011]. Retrieved from the internet: <URL: http://www.vmware.com/pdf/vdm20_intro.pdf>, pp. 1-32.*

Eric Harney et al., The Efficacy of Live Virtual Machine Migrations Over the Internet, ACM 978-1-59593-897-8, 2007, [Retrieved on Jul. 26, 2012]. Retrieved from the internet: <URL: http://dl.acm.org/citation.cfm?id=1408662> 7 Pages (1-7).*

(Continued)

Primary Examiner — Don Wong
Assistant Examiner — Anibal Rivera
(74) Attorney, Agent, or Firm — Lowenstein Sandler PC

(57) ABSTRACT

In one embodiment, a mechanism for staged upgrades of a virtual machine system is disclosed. In one embodiment, a method includes determining a minimum number of virtual desktop servers (VDSs) necessary to host one or more VMs associated with the VDSs, migrating in a live manner the one or more VMs to the minimum number of VDSs, upgrading the non-upgraded VDSs that are not hosting any VMs, repeating the migrating and upgrading until all of the VDSs are upgraded, load balancing the VMs among the upgraded VDSs, and upgrading each of the VMs upon hosting of the VM by an upgraded VDS.

20 Claims, 5 Drawing Sheets

OTHER PUBLICATIONS

Tal Maoz et al., Combining Virtual Machine Migration with Process Migration for HPC on Multi-Cluster and Grids, 978-1-4244-2640-9, IEEE 2008, [Retrieved on Jul. 25, 2012]. Retrieved from the internet: <URL: http://ieeexplore.ieee.org/stamp/stamp.jsp?tp=&arnumber?4663759> 10 Pages (89-98).*

Qumranet, Solid ICE™, Connection Broker, Apr. 2008, 7 pages.

Qumranet, KVM-Kernel-based Virtualization Machine, White Paper, 2006, 5 pages.

Qumranet, Solid ICE™, Overview, Apr. 2008, 15 pages.

Qumranet, Solid ICE™, Provisioning Manager, Apr. 2008, 5 pages.

Qumranet, Solid ICE™, Desktop Server (VDS), Apr. 2008, 6 pages.

* cited by examiner

MECHANISM FOR STAGED UPGRADES OF A VIRTUAL MACHINE SYSTEM

TECHNICAL FIELD

The embodiments of the invention relate generally to virtual machine systems and, more specifically, relate to staged upgrades of a virtual machine system.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops have been developed. Such solutions consist of centralized servers that are partitioned into multiple VMs that host the virtual desktops, thereby providing a desktop for each user. The centralized hosting provides the manageability of sever-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one problem that arises with such centralized hosting of VMs is handling the upgrade process. There are many components involved in upgrading a VM system, such as the platform of the system and the VMs themselves. Presently, upgrade solutions for VM systems require each VM to be shut down and migrated to a different host, resulting in an interruption to the VM service for an end user of the VM. In addition, present solutions for upgrading individual VMs expose the VMs to potential security risks, such as being commandeered via the upgrade process by another user. As such, a solution for managing upgrades of a VM system that provides improved security and does not interrupt the VMs would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
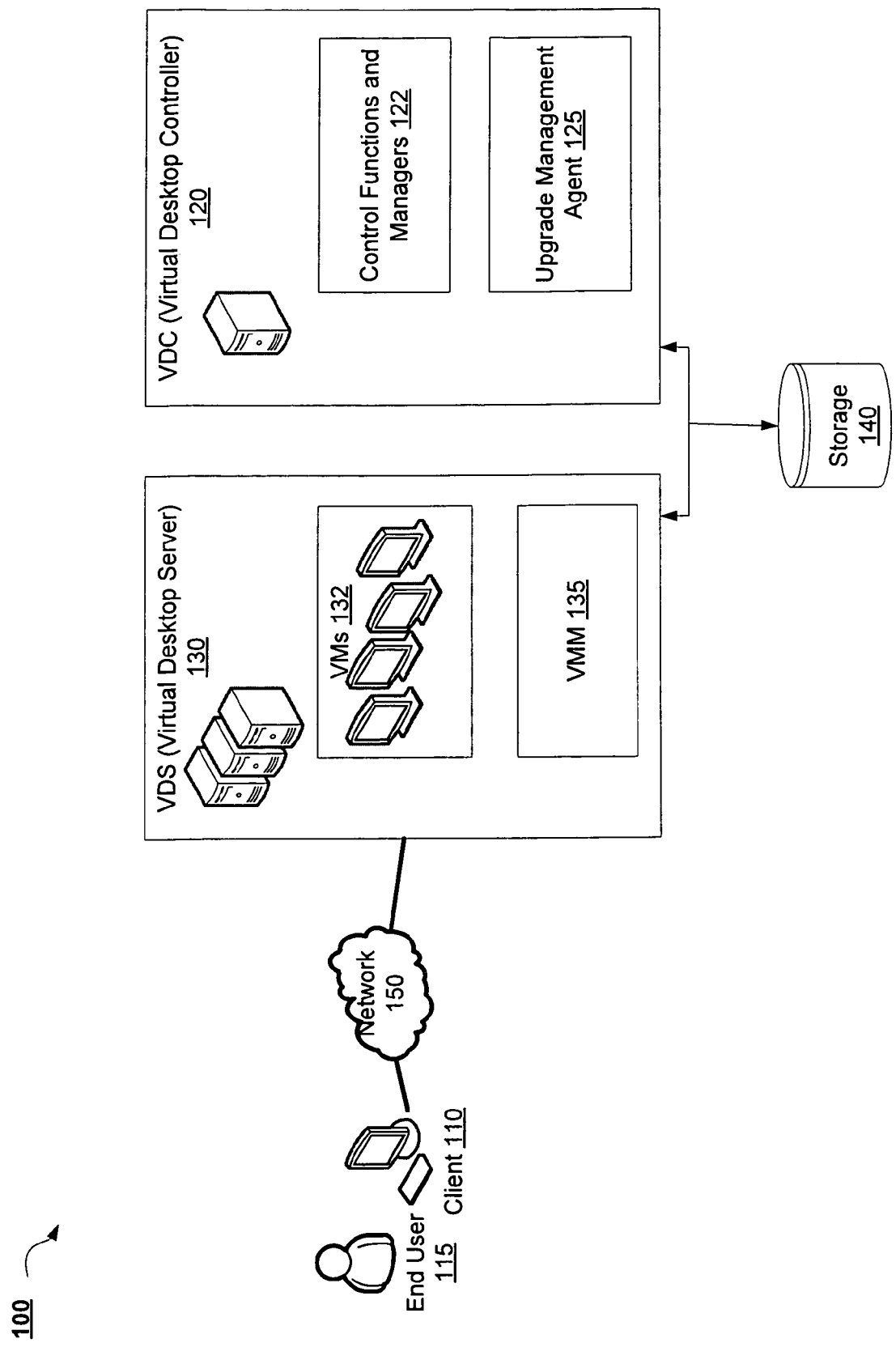
FIG. 1 is a block diagram of a virtual machine system for implementing staged upgrades according to embodiments of the invention.

Embodiments of the invention provide for a mechanism for staged upgrades of a virtual machine system. In one embodiment, a method of staged upgrades of a virtual machine system includes determining a minimum number of virtual desktop servers (VDSs) necessary to host one or more VMs associated with the VDSs, migrating in a live manner the one or more VMs to the minimum number of VDSs, upgrading the non-upgraded VDSs that are not hosting any VMs, repeating the migrating and upgrading until all of the VDSs are upgraded, load balancing the VMs among the upgraded VDSs, and upgrading each of the VMs via a compact disc (CD) upgrader agent upon hosting of the VM by an upgraded VDS.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for staged upgrades of a virtual machine system. A VM system includes many components and parts and, as such, embodiments of the invention upgrade the system in a staged manner. A first stage of the VM system upgrade of embodiments of the invention is the upgrade of the components that host and control the multiple VMs in the system. The second stage of the VM upgrade of embodiments of the invention is the upgrade of each individual VM. Further details of each stage of the upgrade of a VM system of embodiments of the invention are described below.

FIG. 1 is a block diagram of a VM system 100 for implementing staged upgrades according to embodiments of the invention. One skilled in the art will appreciate that other architectures for VM system 100 are possible, and the implementation of a VM system utilizing embodiment of the invention are not necessarily limited to the specific architecture depicted by FIG. 1.

VM system 100 includes a client 110 used by an end user 115 connected via network 150 to one or more virtual desktop servers (VDS) 130 that are managed by a virtual desktop controller (VDC) 120. VDS 130 hosts VMs that run on top of a software layer represented by a virtual machine manager (VMM) 135 that runs directly on the hardware platform of VDS 130. VMM 135 virtualizes the VDS's 130 physical resources for the VMs 132 hosted by VDS 130. VMM 135 may also be referred to as a hypervisor, a kernel-based hypervisor (e.g., Kernel-based VM (KVM)), or a host OS. VMs 132 provide virtual desktops for end users 115.

VDC 120 may be any type of a computing device having a memory, a processor, and so on. VDC 120 is coupled to the VDS 130 and contains all the control functions, including management of the overall virtual desktop environment, for the VM system 100. VDC 120 includes control functions and managers 122 for management of the VM system 100. For example, control functions and managers 122 may provide for provisioning individual virtual desktops and pools of virtual desktops, high availability (HA) logic 124 to handle VDS 130 and VDC 120 failures, image management control to manage virtual desktop images, and session management/connection brokers to establish connections between the end user 115 and the associated virtual desktop 132.

In addition, VDC 120 includes an upgrade management agent 125 to oversee and control upgrades of the VDC 120 itself and the one or more VDS 130. In one embodiment of the invention, a first stage of upgrading VM system 100 is controlled by upgrade management agent 125 applying an upgrade to itself and each VDS 130 it oversees. Upgrade management agent 125 may utilize upgrade files kept in a standard upgrade repository found in storage 140. Once VDC 120 has been upgraded, upgrade management agent 125 then instructs each VDS 130 under its control to upgrade via an upgrade file provided by the VDC upgrade management agent 125.

Embodiments of the invention utilize live migration of VMs 132 between multiple VDSs 130, in order to provide minimal disturbance to the end user 115 of a VM while the VM system 100 is being upgraded. Live migration is a feature that enables the migration of a running VM 132 from one physical machine to another physical machine, such as between VDSs 130. This migration occurs without losing any data or operations and appears to an end user 115 of the VM as a seamless operation.

For example, assume that VDC 120 controls two VDSs 130 that are hosting 10 VMs between them. After VDC 120 is upgraded, the upgrade management agent 125 instructs the two VDSs 130 to live migrate the VMs hosted by the VDS to be upgraded first to the other VDS. Once the VMs have been migrated, the VDS without VMs is upgraded via controls from the upgrade management agent 125. Then, the upgrade management agent 125 instructs the VDSs 130 to live migrate the 10 VMs running on the non-upgraded VDS to the upgraded VDS. The upgrade management agent 125 can then upgrade the other VDS, and subsequently load balance the 10 VMs between the two upgraded VDSs.

In one embodiment, if more than two VDSs are being upgraded, then the upgrade management agent 125 oversees the upgrade of these VDSs in an asynchronous manner. For instance, if a VDC 120 oversees 10 VDSs 130 with 1,000 VMs 132 hosted between them, the upgrade management agent 125 determines how much the VM system may be contracted in order to host all of the VMs. In other words, the upgrade management agent 125 determines how many VDSs 130 are necessary to host the 1,000 VMs. The upgrade management agent 125 then utilizes the minimum required number of VDSs to migrate the VMs onto, and then updates the other VDSs without VMs. The upgrade management agent 125 repeats this process until all of the VDSs have been upgraded.

For example, if the upgrade management agent 125 determines that it requires at least 3 VDSs to host 1,000 VMs, then it will instruct the VDSs to migrate the 1,000 VMs to 3 of the VDSs, and then will upgrade the 7 VDSs that are not hosting any VMs. Then, the upgrade management agent 125 instructs the VDSs to load balance the 1,000 VMs among the 7 upgraded VDSs, and subsequently upgrades the 3 remaining VDSs. Finally, the upgrade management agent 125 instructs all of the 1,000 VMs be load balanced among the 10 upgraded VDSs.

Figure 2:
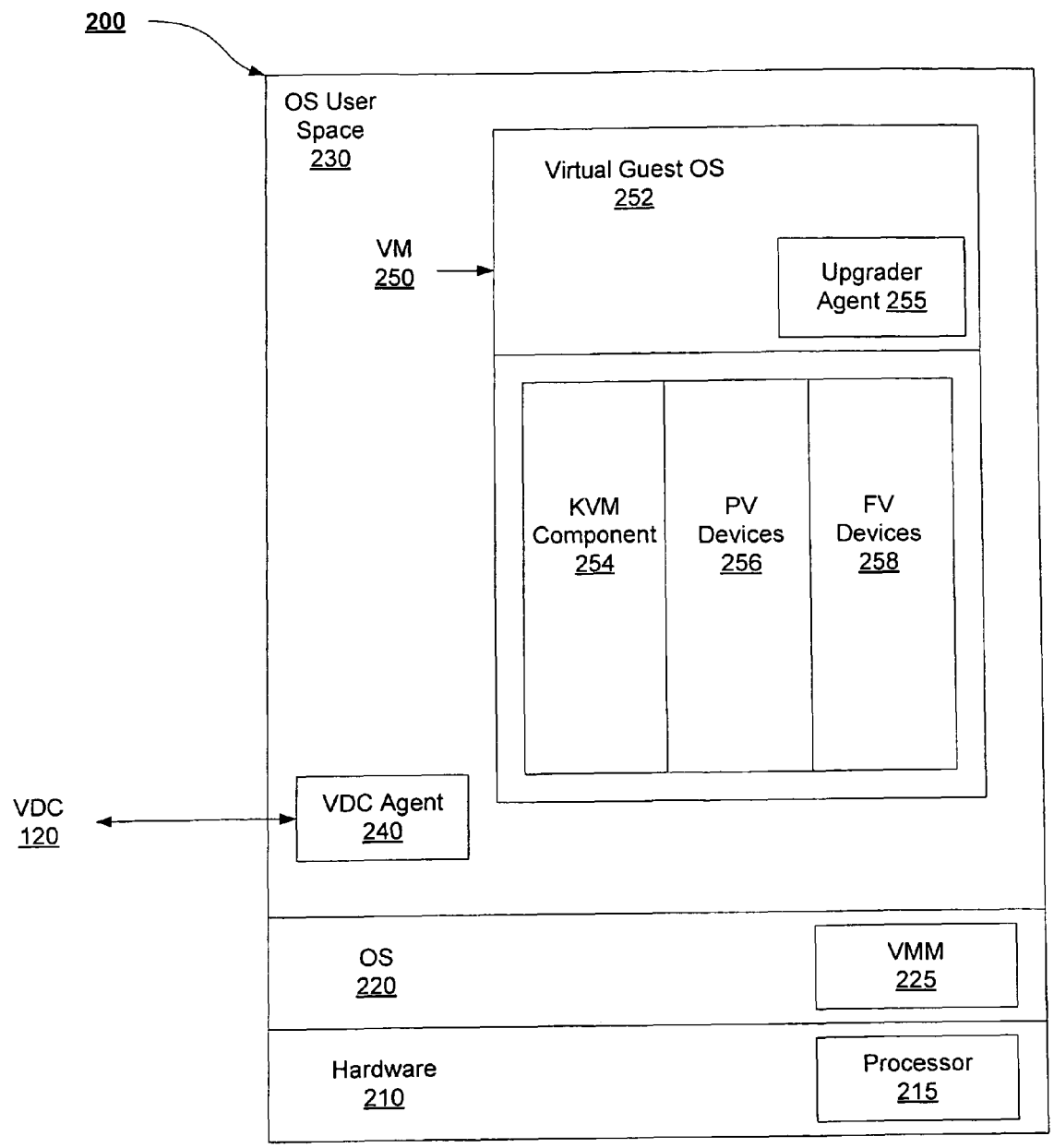
FIG. 2 is a block diagram of a virtual desktop server hosting a virtual machine as part of staged upgrades of embodiments of the invention.

According to further embodiments of the invention, once the VDC 120 and all of the VDSs 130 have been upgraded, staged upgrade of VM system 100 then turns to upgrading each of the individual VMs 132 hosted by the upgraded VDSs 130. FIG. 2 is a block diagram of a VDS 200 hosting a VM 250 to be upgraded as part of the staged upgrades of embodiments of the invention. In one embodiment, VDS 200 is the same as VDS 130 described with respect to FIG. 1.

VDS 200 includes a hardware layer 210 containing the physical infrastructure to operate VDS 200, such as processor 215. In one embodiment, processor 215 may be an Intel™ VT processor or an AMD™-V processor. VDS 200 runs an operating system (OS) 220 on top of its hardware layer 210. In one embodiment, the OS 220 is a Linux OS. The OS software 220 includes a VMM 225 to manage each instantiation of a VM hosted by VDS 200. VMM 225 virtualizes the VDS's 200 physical resources 210 for the VMs hosted by VDS 200. VMM 225 may also be referred to as a hypervisor, a kernel-based hypervisor (e.g., Kernel-based VM (KVM)), or a host OS. In one embodiment, VMM 225 adds KVM as a loadable kernel module, thus making the OS 220 the virtualization platform or hypervisor for the virtualization system of VDS 200.

The VDS 200 further includes OS user space 230 where the VM 250 is hosted. The VM 250 includes a virtualization component 254 that exposes the virtual hardware (CPU, memory, and other virtualized devices like network, block/storage, keyboard, etc.) to the virtual desktop. In one embodiment, the virtualization component 254 is a KVM/Qemu component. Some of the virtual hardware devices like the keyboard, screen, USB (and some network devices that are not performance sensitive and have a canonical hardware) may be "fully virtualized" or emulated 256. Some other devices like the network device and block devices (storage) that are performance sensitive may be para-virtualized 258, meaning that they have direct access to hardware in order to improve the performance. In addition, VM includes a virtual guest OS 252 running on top of and utilizing the virtualized components of VM.

In one embodiment the VM 250 includes an upgrader agent 255, which is an agent which lives within the VM 250 and identifies an upgrade package for the VM 250 by signature. The upgrader agent 255 runs on top of the virtual guest OS 252. After a VDC 120 upgrades a VDS 200 and migrates one or more VMs 250 back onto the VDS 200, as previously described above, the VDC 120 signals the upgraded VDS 200 to upgrade the migrated VMs 250. In another embodiment, the VM 250 may be upgraded prior to its migration (for the upgrade of its associated VDS 200). In this way, upon return of the VM250 to the upgrade VDS 200, the VM 250 will be ready for the new version of the VDS 200 and can take immediate use of its new features.

The VDC 120 makes an "upgrade package" for the VM 250 available via a VDC agent 240 that is included in the OS user space 230. The VDC agent 240 interfaces with the VDC 120 for management functions like starting and stopping VMs 250, taking snapshots, etc. In one embodiment, the "upgrade package" from the VDC 120 may have a structure of a CD, with each file digitally signed with a signature file. In other embodiments, the "upgrade package" may be any format supported by the VM 250 and readable through the virtual guest OS 252.

For the following description, assume that the "upgrade package" has a CD format, although as discussed above this particular format is not required. In this case, the VM 250 treats the "upgrade package" from the VDC 120 as a regular CD. As such, the upgrader agent 255 verifies the signature to identify an upgrade package and performs whatever the package indicates needs to be done for the upgrade of VM 250. When the upgrader agent 255 identifies a CD it is familiar with, the agent 255 goes over all the files located on the CD and checks the signatures. The upgrader agent 255 has public key, and the CD upgrade package is signed with a private key.

In one embodiment, the private key may be provided by an upgrade management agent of VDS, such as upgrade management agent 125 described with respect to FIG. 1. In other embodiments, the private key is provided by another trusted source, such as the organization producing the upgrade package. Utilization of administrative permission by the staged upgrade system of embodiments of the invention prevents unauthorized packages from being installed automatically to a VM that could in turn allow a VM to be taken over by an unauthorized user. In one embodiment, the signature check is done against a supplied trust store to enhance security (versus trusting the guest stores).

In other embodiments, the upgrader agent 255 may be utilized to upgrade any component of the VM 250. This includes upgrading any software on the VM 250 such as, for example, word processing software. In addition, in embodiments of the invention the upgrader agent 255 itself may also be upgraded by an upgrade package. Embodiments of the invention support signing the "upgrade package" with any trusted private key to support all kinds of upgrades to VM 250 components.

Figure 3:
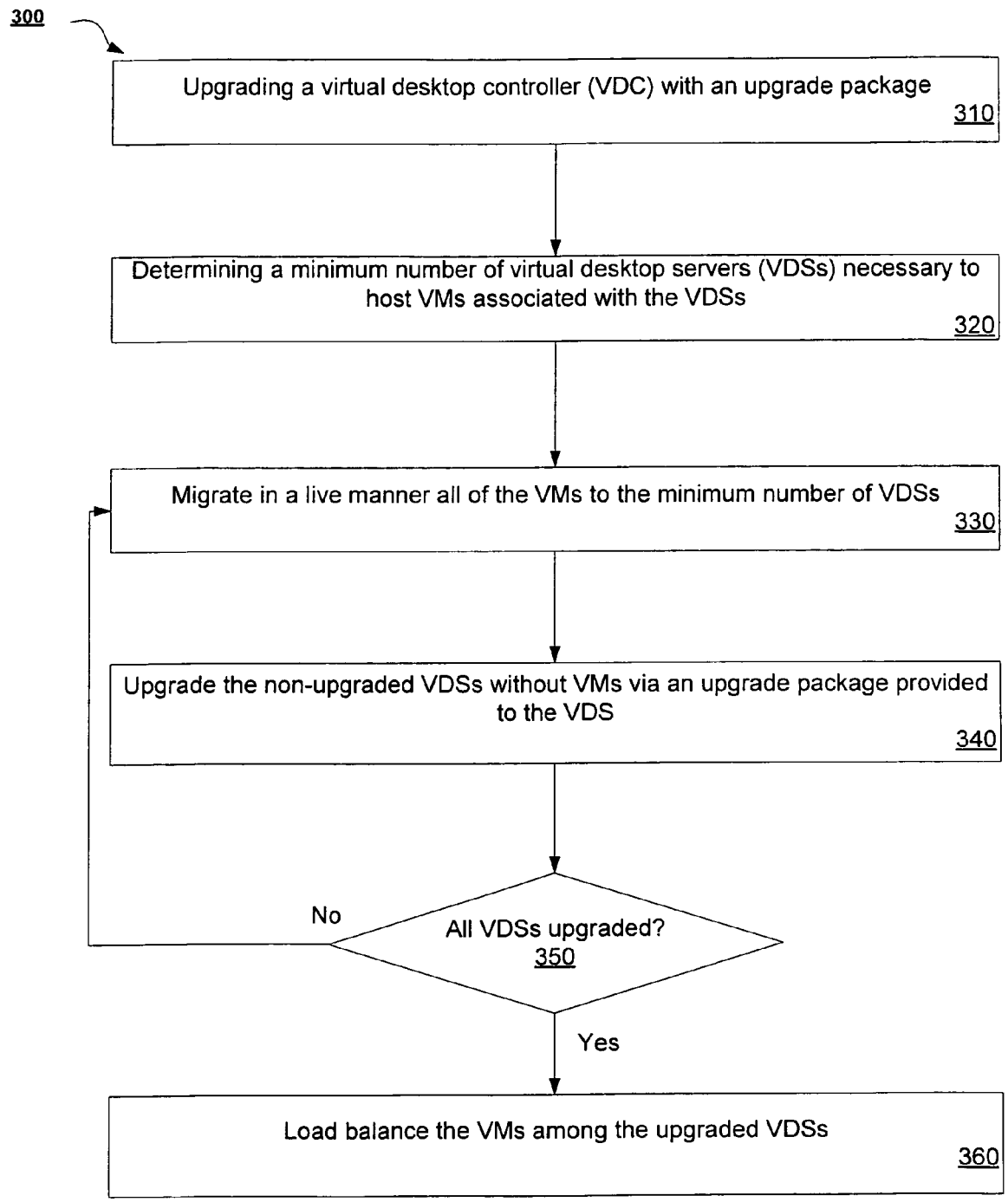
FIG. 3 is a flow diagram illustrating a method for a first portion of a staged upgrade of a virtual machine system according to an embodiment of the invention.

FIG. 3 is a flow diagram illustrating a method 300 for a first portion of a staged upgrade of a VM system according to an embodiment of the invention. This first portion of the staged upgrade of the VM system upgrades a VDC and VDSs by utilizing live migration of VMs. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by upgrade management agent 125 of FIG. 1.

Method 300 begins at block 310 where a VDC is upgraded with an upgrade package. In one embodiment, this upgrade package may be provided by an organization that manufactures the VDC via a storage repository the VDC can access. Then, at block 320, a minimum number of VDSs necessary to host VMs associated with the VDSs is determined. The VDSs are those managed and controlled by the upgraded VDC. At block 330, all of the VMs associated with the VDSs are migrated in a live manner to the minimum number of VDSs. As discussed above, live migration enables transfer of a VM among VDS without interrupting the end user experience of the VM.

At block 340, the non-upgraded VDSs that are not hosting VMs are upgraded via an upgrade package provided to the VDSs. In one embodiment, the upgrade package is located in a storage repository that the VDC is capable of accessing. At block 350 it is determined whether all the VDSs have been upgraded. If not, then method 300 returns to block 330 to migrate the VMs again in order to release additional VDSs for upgrade. Once all VDSs have been upgraded at block 350, the VMs are load balanced among all of the upgraded VDSs at block 360.

Figure 4:
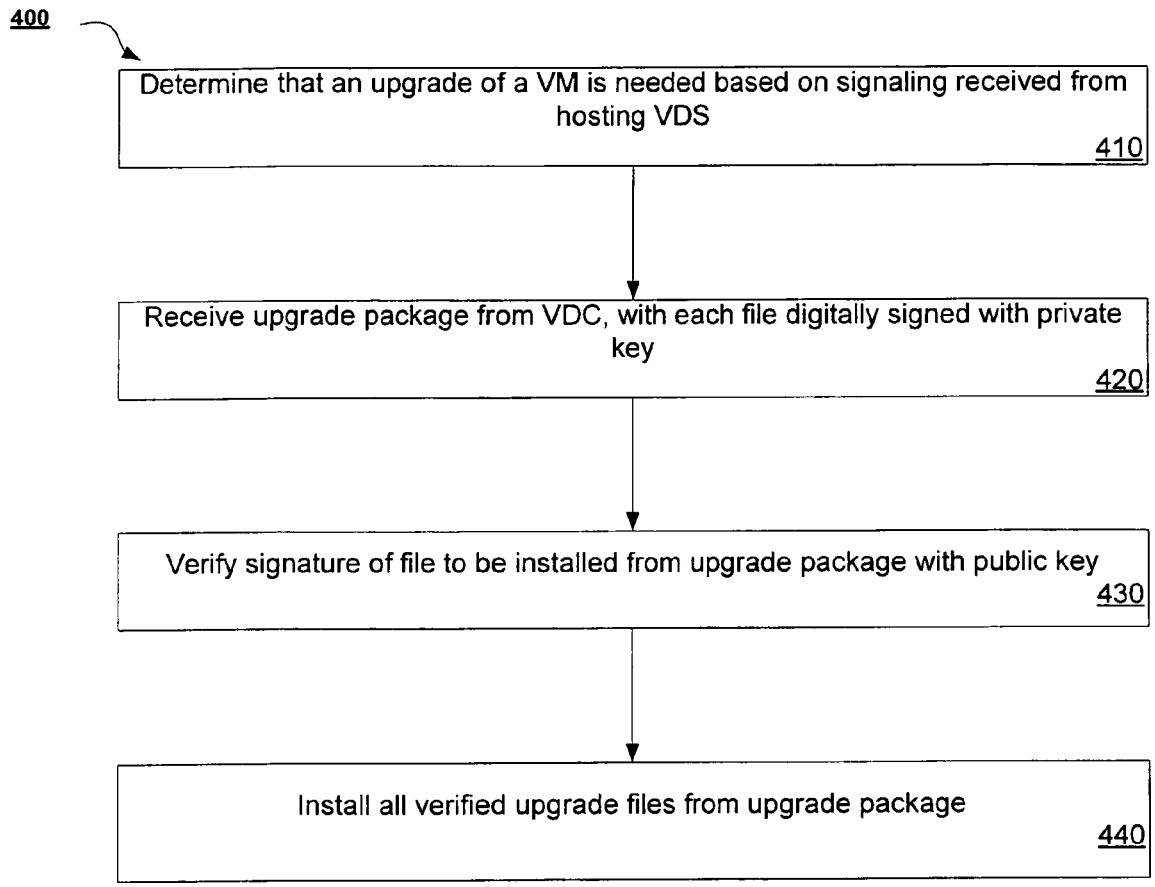
FIG. 4 is a flow diagram illustrating a method for a second portion of a staged upgrade of a virtual machine system according to an embodiment of the invention.

FIG. 4 is a flow diagram illustrating a method 400 for a second portion of a staged upgrade of a VM system according to an embodiment of the invention. The second portion of the staged upgrade of the VM system upgrades one or more VMs utilizing a upgrader agent located in each of the VM(s). Method 400 may be performed by processing logic that may comprise hardware (e.g., circuitry, dedicated logic, programmable logic, microcode, etc.), software (such as instructions run on a processing device), or a combination thereof. In one embodiment, method 400 is performed by upgrader agent 255 of FIG. 2. In one embodiment, method 400 is performed in conjunction with and subsequent to method 300 of FIG. 3, as part of an entire staged upgrade process for a VM system.

Method 400 begins at block 410 where it is determined that an upgrade of a VM is needed based on signaling received from a hosting VDS of the VM. In one embodiment, a VDC controlling the hosting VDS notifies the VDS to upgrade the VMs it is hosting. At block 420, an upgrade package is received from the VDC controlling the hosting VDS. In one embodiment, the upgrade package is in the structure of a CD with each file on the CD digitally signed with a private key. In other embodiments, a different format for the upgrade package that is supported by the VM and readable through the virtual guest OS may be utilized. As discussed above, the private key may be provided by an upgrade management agent of VDC or via another trusted source.

At block 430, the signature of each file to be installed from the upgrade package for the upgrade to the VM is verified with a public key held by the VM. Finally, at block 440, all verified files from the upgrade package are installed to upgrade the VM. In one embodiment, the upgrade package not only upgrades specific components of the VM but may also upgrade the upgrade agent of the VM itself.

Figure 5:
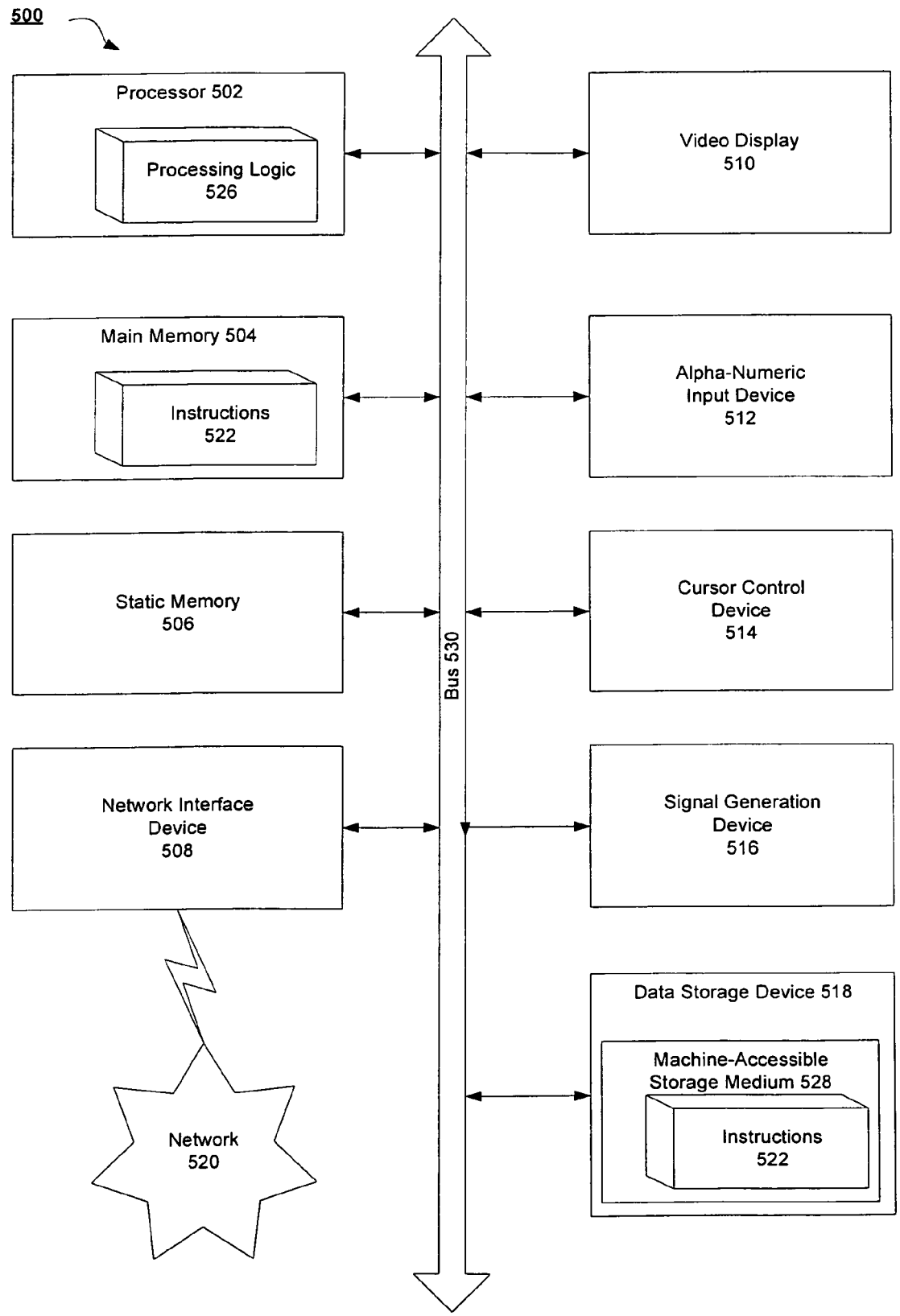
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to stored instructions to perform embodiments of the staged upgrades of VM system, such as VM system 100 of FIG. 1, using methods 300 and 400 described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
    determining a minimum number of virtual desktop servers (VDSs) to host virtual machines (VMs) associated with the VDSs;
    migrating, while the VMs are executing, the VMs to the minimum number of VDSs;
    upgrading the VDSs that are not hosting any VMs and that are not upgraded;
    load balancing the VMs among the upgraded VDSs;
    while one or more of the VDSs are not upgraded, repeating the migrating, the upgrading, and the load balancing until each of the VDSs are upgraded; and when each of the VDSs are upgraded, upgrading each of the VMs upon load balancing and hosting of the VM by one of the upgraded VDSs.

2. The method of claim 1, wherein the migrating the VMs further comprises moving a VM of the VMs to a VDS that is different than a VDS hosting the VM, the moving occurring without shutting down the VM.

3. The method of claim 2, wherein the upgrading of each of the VMs is managed by an upgrader agent of each VM that is upgraded.

4. The method of claim 1, wherein the upgrading each of the VMs further comprises receiving an upgrade package having a format supported by the VMs.

5. The method of claim 4, wherein the VMs receive the upgrade package in response to a request by the VMs for the upgrade package based on signaling received from their associated upgraded VDS, the signaling originating from a virtual desktop controller (VDC) managing the VDSs.

6. The method of claim 4, wherein the upgrading each of the VMs further comprises verifying a signature of a file in the upgrade package.

7. The method of claim 6, wherein verifying the signature includes matching a private key of the signature file with a public key of the VM.

8. The method of claim 1, wherein the upgrading the VDSs further comprises the VDSs receiving an upgrade file from a storage repository.

9. A system, comprising:
a memory;
a processing device communicably coupled to the memory;
a virtual desktop controller (VDC) executable from the memory by the processing device, the VDC configured to manage a plurality of virtual desktop servers (VDSs); and
a power management agent of the VDC, the power management agent operable to:
determine a minimum number of the plurality of VDSs necessary to host virtual machines (VMs) associated with the VDSs;
migrate, while the VMs are executing, the VMs to the minimum number of VDSs;
upgrade the VDSs that are not hosting any VMs and that are not upgraded;
load balance the VMs among the upgraded VDSs;
while one or more of the VDSs are not upgraded, repeat the migrating, the upgrading, and the load balancing until each of the VDSs are upgraded; and
when each of the VDSs are upgraded, upgrade each of the VMs upon load balancing and hosting of the VM by one of the upgraded VDSs.

10. The system of claim 9, wherein the power management agent to migrate the VMs further comprises the power management agent operable to move one or more of the VMs to a VDS that is different than a VDS hosting the one or more of the VMs, without shutting down the one or more of the VMs.

11. The system of claim 9, wherein the upgrade of each of the VMs is managed by an upgrader agent of the VM.

12. The system of claim 11, wherein the power management agent operable to upgrade each of the VMs further comprises the power management agent operable to receive an upgrade package at the upgrader agent of each VM of the VMs, the upgrade package in a format supported by the VMs.

13. The system of claim 12, wherein the power management agent operable to upgrade each of the VMs further comprises the power management agent operable to verify a signature of a file in the upgrade package by matching a private key of the signature file with a public key of the VM.

14. The system of claim 12, wherein the VDC further operable to instruct each upgraded VDS to signal each upgrader agent of its associated VMs to upgrade the VM via the upgrade package.

15. The system of claim 9, wherein the power management agent operable to upgrade the VDSs further comprises the VDS receiving an upgrade file from a storage repository.

16. A non-transitory machine-readable storage medium including data that, when accessed by a machine, cause the machine to perform operations comprising:
determining a minimum number of virtual desktop servers (VDSs) to host virtual machines (VMs) associated with the VDSs;
migrating, while the VMs are executing, the VMs to the minimum number of VDSs;
upgrading the VDSs that are not hosting any VMs and that are not upgraded;
load balancing the VMs among the upgraded VDSs;
while one or more of the VDSs are not upgraded, repeating the migrating, the upgrading, and the load balancing until each of the VDSs are upgraded; and
when each of the VDSs are upgraded, upgrading each of the VMs upon load balancing and hosting of the VM by one of the upgraded VDSs.

17. The non-transitory machine-readable storage medium of claim 16, wherein the live migration includes moving a VM to another VDS without shutting down the VM.

18. The non-transitory machine-readable storage medium of claim 16, wherein the upgrading each of the VMs further comprises an upgrader agent of each VM receiving an upgrade package having a format supported by the VM.

19. The non-transitory machine-readable storage medium of claim 18, wherein the upgrading each of the VMs further comprises verifying a signature of a file in the upgrade package by matching a private key of the signature file with a public key of the VM.

20. The non-transitory machine-readable storage medium of claim 18, wherein the VMs receive the upgrade package in response to a request by the VMs for the upgrade package based on signaling received from their associated upgraded VDS, the signaling originating from a virtual desktop controller (VDC) managing the VDSs.

* * * * *